(12) United States Patent
Najdek et al.

(10) Patent No.: US 11,979,006 B2
(45) Date of Patent: May 7, 2024

(54) TWO-STEP INTERLOCK FOR MODULES IN A MOTOR CONTROL CENTER

(71) Applicant: Rockwell Automation Technologies, Inc., Mayfield Heights, OH (US)

(72) Inventors: Damian Najdek, Gliwice (PL); Karol Knoll, Myslowice (PL)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 787 days.

(21) Appl. No.: 17/147,945

(22) Filed: Jan. 13, 2021

(65) Prior Publication Data

US 2022/0224085 A1 Jul. 14, 2022

(51) Int. Cl.
| | |
|---|---|
| *H02B 1/48* | (2006.01) |
| *H02B 11/133* | (2006.01) |
| *H02B 13/00* | (2006.01) |

(52) U.S. Cl.
CPC .............. *H02B 1/48* (2013.01); *H02B 11/133* (2013.01); *H02B 13/00* (2013.01)

(58) Field of Classification Search
CPC .... H02B 11/127; H02B 11/133; H02B 13/00; H02B 1/32; H02B 1/46; H02B 1/48
See application file for complete search history.

(56) References Cited

U.S. PATENT DOCUMENTS

| | | | | |
|---|---|---|---|---|
| 8,304,672 B2 * | 11/2012 | Lee | .............. | H02B 11/127 |
| | | | | 200/50.25 |
| 8,638,561 B2 * | 1/2014 | Lehtola | .............. | H05K 7/1409 |
| | | | | 361/807 |
| 8,796,570 B2 * | 8/2014 | Kobayashi | .............. | H01H 9/26 |
| | | | | 200/50.22 |
| 9,466,965 B2 * | 10/2016 | Lehtola | .............. | H05K 7/1411 |
| 2018/0152007 A1 * | 5/2018 | Kroushl | .............. | H02B 1/306 |
| 2022/0173580 A1 * | 6/2022 | Shi | .............. | H02B 11/173 |

FOREIGN PATENT DOCUMENTS

| | | | | |
|---|---|---|---|---|
| CN | 212751609 U | * | 3/2021 | |
| CN | 114256770 A | * | 3/2022 | |
| CN | 216750954 U | * | 6/2022 | |
| CN | 116111497 A | * | 5/2023 | |

\* cited by examiner

*Primary Examiner* — Andrew M Roersma
(74) *Attorney, Agent, or Firm* — Boyle Fredrickson, S.C.

(57) ABSTRACT

An apparatus for interlocking the connection handle of a module for a motor control center (MCC) engages a locking plate to prevent inadvertent motion of the connection handle. When the apparatus is not pressed, it allows the locking plate to fully engage the connection handle, preventing the connection handle from changing position. When the apparatus is in a first angular orientation, it may only be pressed into the module for a first depth. At the first depth, the apparatus engages the locking plate to allow the connection handle to transition between an off position and a test position. When the apparatus is rotated to a second angular orientation, it may be pressed into the module for a second depth. At the second depth, the apparatus causes the locking plate to disengage the connection handle, allowing the connection handle to be moved between any desired position.

20 Claims, 11 Drawing Sheets

TWO-STEP INTERLOCK FOR MODULES IN A MOTOR CONTROL CENTER

BACKGROUND INFORMATION

The subject matter disclosed herein relates to a Motor Control Center (MCC), More specifically, a rotatable pushbutton is provided which provides a first orientation and a second orientation to selectively engage a connection handle during insertion of a module into the MCC.

As is known to those skilled in the art, a Motor Control Center (MCC) is a power distribution center to control multiple motors from a central location. The MCC includes a power infeed configured to receive the power which is, in turn, distributed to each of the motors controlled by the MCC. The power may be a multi-phase alternating current (AC) power supply such as a 230 VAC or a 460 VAC three-phase utility supply. A primary breaker is sized according to the combined current ratings of each module to be included within the MCC and allows for a central disconnect of the MCC from the utility supply. Within the MCC a series of voltage busses extend horizontally and/or vertically to distribute the utility voltage to each module within the MCC. The MCC may include a single vertical unit, configured to receive multiple modules or multiple vertical units stacked adjacent to each other, where each vertical unit is configured to receive one or more modules.

The vertical unit includes slots configured to receive modules which are, in turn, configured to control operation of a motor. Each module may be, for example, a contactor configured to enable or disable a motor, a reversing contactor configured to additionally control direction of rotation of the motor, a starter configured to accelerate and/or decelerate a motor according to a preset ramp or acceleration profile, or a motor drive configured to control operation of the motor according to a position, velocity, or torque command. Additional modules may be provided, for example, that measure voltage anchor current being conducted along a bus within the MCC and that display the information to a technician. Each module is inserted into one of the slots on the MCC. Empty slots may receive a cover plate to prevent access internal to the MCC during operation.

Modules are configured to be inserted into and removed from the MCC with the module in an off condition. It is contemplated that an individual slot may be accessed with power supplied to the MCC, allowing "hot-swaps" of a module that has failed or insertion of a new module without requiring all motors controlled by the MCC to be shut down. A cover plate is removed, or an old module removed, and a new module is inserted into one of the slots. After insertion into the slot, a handle, also referred to herein as a connection handle, is used to fully engage the module within the MCC. During insertion, the connection handle is initially in an off position. The module is inserted a first distance into the MCC by manual insertion. The connection handle may then be moved between an off position and a test position. In the test position, the module is drawn further into the MCC, establishing connections with control power and network communications. The connection handle may be moved still further to an on position, where moving the handle to the on position mechanically draws the module still further into the MCC, during which contacts on the module engage the bus bars within the MCC and connect the module to the power distributed within the MCC.

The connection handle is configured to transition between each of the off, test, and on positions. In one embodiment, the handle may transition sequentially from an off position, to a test position, and then to an on position. In another embodiment, the off position may be a central position and the handle may transition in one direction to a test position and in the opposite direction to an on position. It is contemplated that the handle may include detents, a cam configuration, or some other mechanical assembly which offers some resistance to movement of the connection handle or otherwise provides tactile feedback to a technician that the handle has physically transitioned, between two positions. The potential exists, however, that the connection handle may be moved in an undesired manner during insertion of the module to the MCC. In the first embodiment, the handle may inadvertently travel too far from the off position to the on position when the intention was to stop at the test position. In the second embodiment, the handle may inadvertently be moved in the incorrect direction to an on position rather than to a test position. Consequently, the potential exists that the module may be unintentionally connected to the line power without first completing desired testing of the module.

Thus, it would be desirable to provide a system for initially interlocking the connection handle of a module for a motor control center (MCC) as the connection handle transitions between positions to prevent an undesired motion to the on position.

BRIEF DESCRIPTION

According to one embodiment of the invention, an apparatus for interlocking selection of an operating mode for a module in a motor control center includes a housing, a first elongated member, a second elongated member, a guide member, and a spring. The housing has a first end and a second end, a first opening in the first end, a second opening in the second end, and a cavity extending through the housing from the first opening to the second opening. The first elongated member is configured to be mounted within the housing and to extend through the first opening. The first elongated member includes a first channel extending along a first length of a surface of the first elongated member, a second channel extending along a second length of the surface of the first elongated member, the second length greater than the first length, and a third channel extending between the first channel and the second channel. The guide member is mounted within the housing and is configured to selectively engage the first channel, the second channel, or the third channel. The second elongated member is configured to be mounted within the housing and to extend through the second opening. The second elongated member has a first end configured to engage the first elongated member within the housing and a second end positioned outside the housing. The spring has a first end mounted to the first elongated member and a second end configured to engage a spring seat at the second end of the housing.

According to another embodiment of the invention, an apparatus for interlocking selection of an operating mode for a module in a motor control center includes a housing, an actuator and a spring. The housing has a cavity extending a length of the housing. The actuator includes a first part extending, at least in part, from a first end of the housing and a second part extending, at least in part, from a second end of the housing. The first part of the actuator is configured to receive a compression force and a rotational force, and the second part of the actuator is configured to engage the first part of the actuator within the housing. The spring is mounted within the housing. The first part of the actuator is configured to move between a first orientation and a second orientation responsive to the rotational force. The first part of the actuator enters a first end of the housing a first distance in the first orientation responsive to the compression force, and the first part of the actuator enters the first end of the housing a second distance in the second orientation responsive to the compression force. The spring returns the first part of the actuator to an extended position when the compression force is removed. The second part of the actuator engages the first part of the actuator to extend from and retract into a second end of the housing when the first part of the actuator enters and exits the first end of the housing, and the second part of the actuator is configured to maintain a consistent orientation when the first part of the actuator rotates between the first and second orientations.

According to still another embodiment of the invention, a method kw interlocking selection of an operating mode for a module in a motor control center is disclosed. An actuator is pressed to move the actuator from a first position to either a second position or a third position. The actuator includes a first channel extending between the first position and the second position, and the actuator includes a second channel extending between the first position and the third position, where the second channel has a greater length than the first channel. The actuator includes a guide member configured to engage either the first channel or the second channel. A connection handle, extending from a front surface of the module, is moved between one of a plurality of positions, where the operating mode corresponds to the position of the connection handle. The connection handle is movable only between a first position and a second position when the guide member engages the first channel, and the connection handle is movable to a third position when the guide member engages the second channel.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
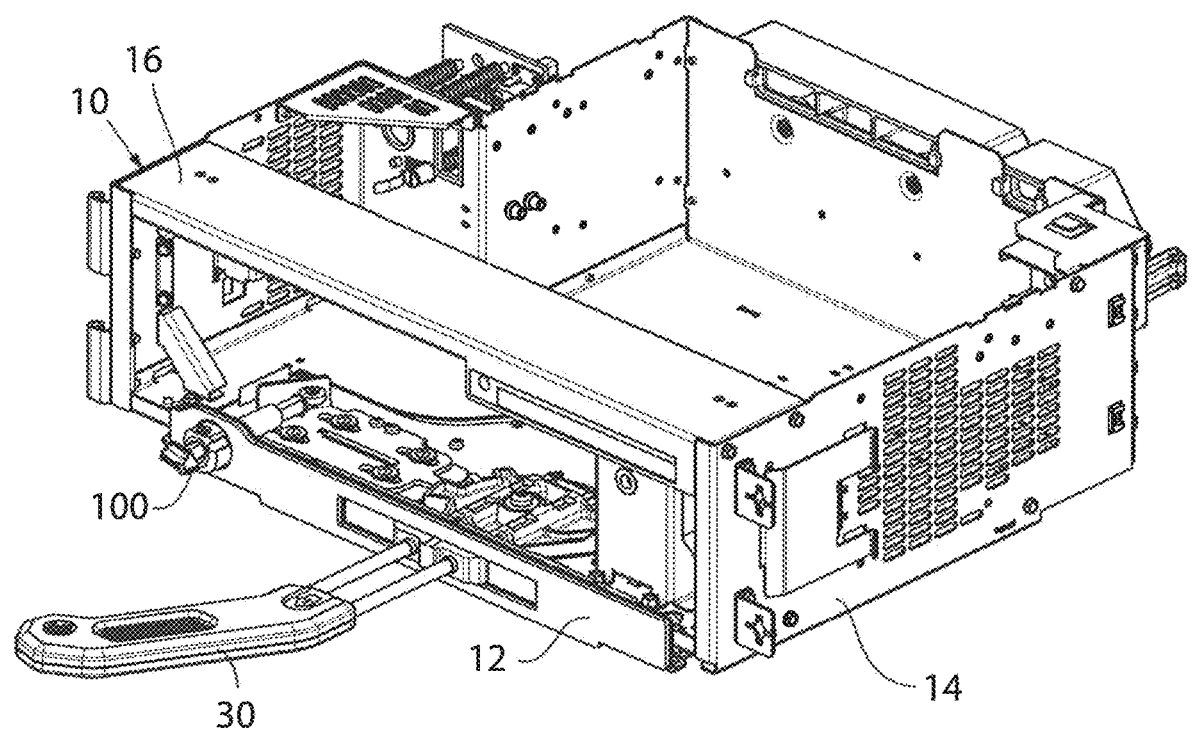
FIG. 1 is a perspective view of a module incorporating one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes a system for initially interlocking the connection handle of a module for a motor control center (MCC) as the connection handle transitions between positions to prevent an undesired motion to the on position. Selection of an operating mode for the module is performed by a dual action process. As discussed above, the module may be placed in three operating states, namely an off operating state, a test operating state, or an on operating state. The connection handle extends from the front of the module and may be manually transitioned between one of three positions to select the desired operating state.

A second actuator is provided to work with the connection handle to perform the dual action process. The second actuator is configured to receive either a compression force or a rotational force. The end of the second actuator extending from the front of the module may be a push button with a handle portion, allowing the button to either be pressed into the module or rotated within the module. The rotational motion is used to transition the second actuator between a first orientation and a second orientation. In the first orientation, the second actuator is configured to be inserted a first depth into the module, and in the second orientation, the second actuator is configured to be inserted a second depth into the module, where the second depth is greater than the first depth.

The second actuator engages a locking plate which, in combination with each other, act to interlock motion of the connection handle, preventing inadvertent motion of the connection handle. The end of the second actuator internal to the module engages the locking plate to move the locking plate between different positions. When the second actuator is not pressed, the end of the second actuator internal to the module either does not engage the locking plate or engages the locking plate only to an extent that allows the locking plate to fully engage the connection handle. When the locking plate fully engages the connection handle, the connection handle may not change position. As a result, the connection handle may not be independently moved without the additional use of the second actuator. With the second actuator in the first position, the second actuator may only be pressed into the module for the first depth. At the first depth, the end of the second actuator internal to the module engages the locking plate such that the locking plate allows the connection handle to transition between the off position and the test position. With the second actuator in the second position, the second actuator may be pressed into the module for the second depth. At the second depth, the end of the second actuator internal to the module engages the locking plate such that the locking plate disengages the connection handle and the connection handle may be moved between any desired position. Thus, during initial installation, the second actuator is oriented into the first position, and the connection handle may only move between the off and test positions. After testing of the module is complete, the second actuator may be rotated to the second position, and the connection handle is now free to move between the off, test, and on positions.

Turning initially to FIG. 1, one embodiment of a module 10 for insertion into a MCC 20 (see also FIG. 1) is illustrated. Each MCC 20 includes at least one and typically a number of vertical columns 22. Multiple modules 10 may be inserted into each column. The module 10 has a housing 15 which is generally a box-like construction, and is also referred to sometimes as drawer, for insertion into the MCC 20. The module 10 is illustrated from the front 12, side 14, and top 16. It is noted that relational terms, such as front, rear, top, bottom, upper, lower, left, right, side, and the like, are used with respect to the figures for ease of description and are not intended to be limiting. The module 10 may, for example, be inserted into a slot within the MCC 20 in a horizontal orientation or a vertical orientation by rotation of the module 10 and by which relational terms are similarly rotated.

Each module 10 includes a connection handle 30 and a second actuator 100 which must be activated in tandem with the connection handle 30 to permit motion of the connection handle 30. With reference also to FIGS. 2-5, the connection handle 30 may be moved between one of three positions to select a desired operating mode of the module 10. The connection handle 30 is mounted to a rotating plate 40 within the module 10. The rotating plate 40 is pivotally mounted around a hub 41 in the rotating plate 40. The rotating plate 40 also includes three detents 42, 44, 46 corresponding to desired positions of the connection handle. A first detent 42 may correspond to an off operating state of the module 10, a second detent 44 may correspond to a test operating state of the module 10, and a third detent 46 may correspond to an on operating state of the module 10. Each detent 42, 44, 46 is configured to receive a protruding member 62 of a locking plate 60. When the protruding member 62 extends into one of the detents 42, 44, 46, the rotating plate 40 and, in turn, the connection handle 30 are prevented from moving to another position. As will be discussed in more detail below, the second actuator 100 engages the locking plate 60 to selectively position the protruding member 62 and, in turn, selectively allow rotation of the connection handle 30.

Figure 2:
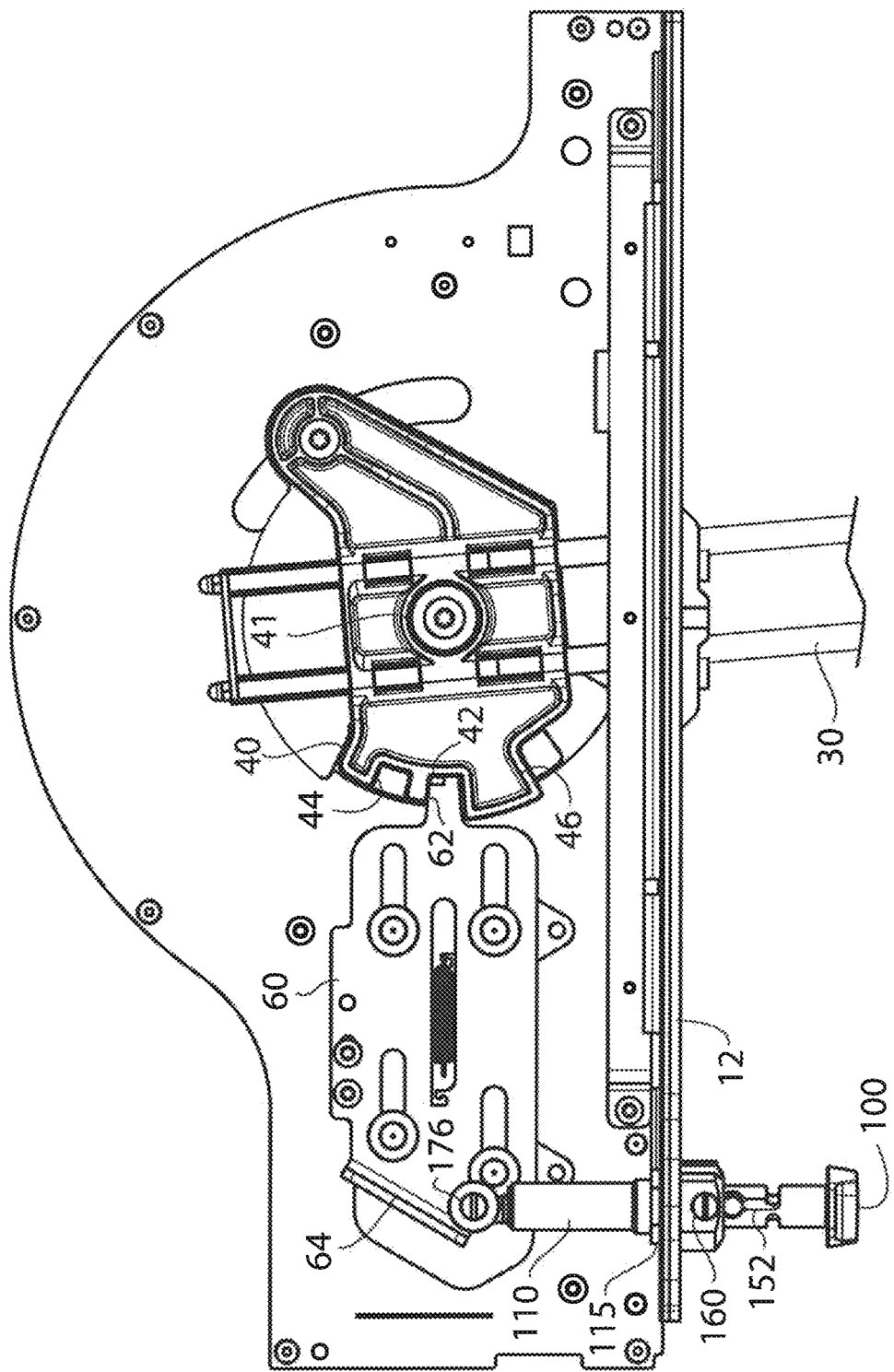
FIG. 2 is a top plan view of the module of FIG. 1 with an actuator assembly according to one embodiment of the invention in a first position and with a linking plate interlocking a connection handle in an off position.

Turning next to FIGS. 6-9, one embodiment of the second actuator 100 is illustrated. The illustrated embodiment of the second actuator 100 includes a housing 110, a first elongated member 140, a second elongated member 170, a guide member 160, and a spring 180. As shown in FIG. 2, the housing 110 is used to mount the second actuator 100 to the front 12 of the module 10. The second housing 110 is configured to be inserted through an opening in the front 12 of the module 10. A first end 120 of the housing 110 includes a collar portion 114, where the collar portion has a diameter greater than the rest of the housing and is configured to seat against the front 12 of the module rather than extend further through the opening. The housing 110 also includes a threaded portion 112 extending for a distance along the length of the housing proximate to the inner surface of the module 10 when the housing 110 is inserted into the module. A nut 115 may be threaded on to the threaded portion 112 of the housing 110 and rotated until it engages the inner surface of the module 10. The nut 115 may be tightened to secure the front 12 of the module 10 between the nut 115 and the collar portion 114 of the housing 110 thereby mounting the housing 110 to the module 10. The use of a nut 115 and threaded portion on the housing 110 is an exemplary method of mounting the housing 110 to the module 10 and is not intended to be limiting. It is contemplated, for example, that a groove on the housing may positioned adjacent the interior surface of the front 12 of the module when the housing 110 is inserted and a retaining clip may be press fit into the groove to prevent removal of the housing 110 from the module. Still other methods of mounting the housing 110 to the module may be utilized without deviating from the scope of the invention.

Figure 10:
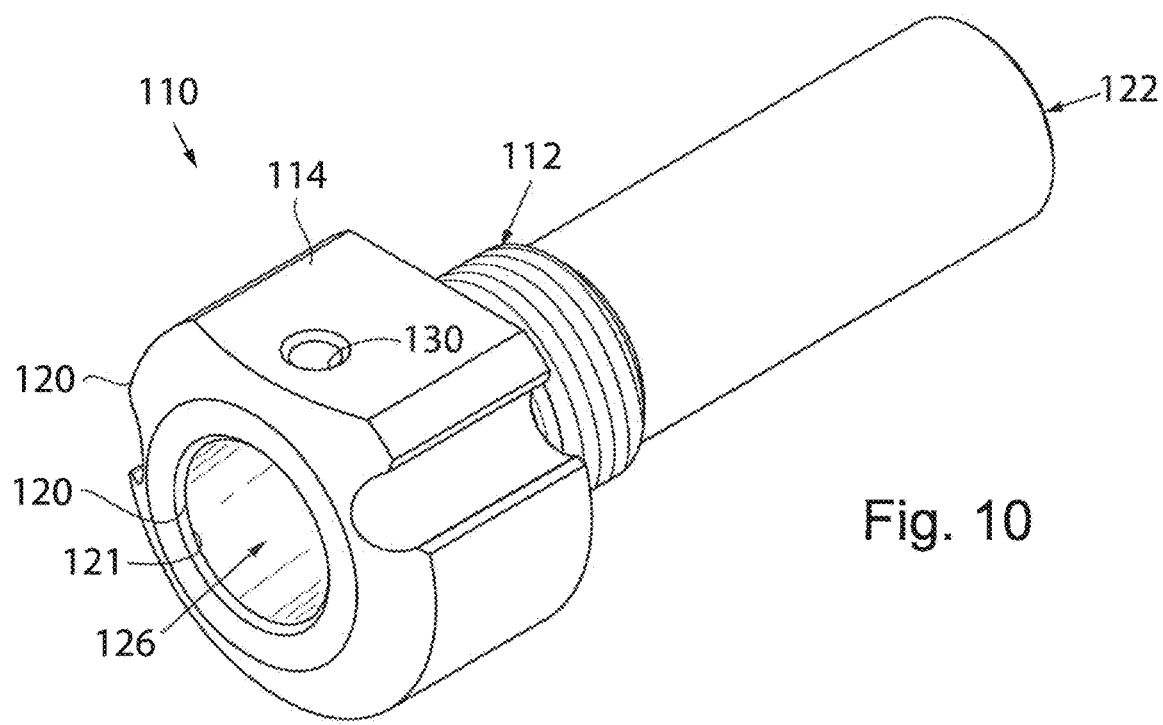
FIG. 10 is a perspective view of a housing for the actuator assembly of FIG. 6 from the front, top, and side.
Figure 11:
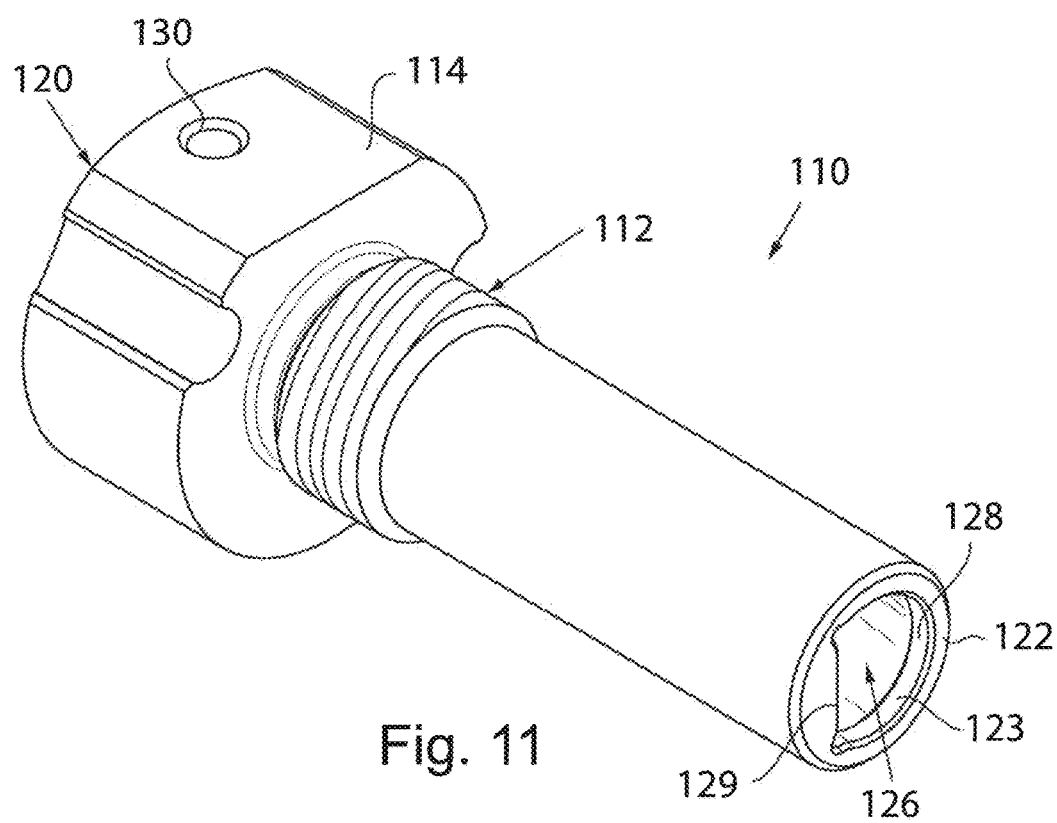
FIG. 11 is a perspective view of the housing for the actuator assembly of FIG. 6 from the top, side, and rear.

With reference also to FIGS. 10 and 11, the housing 110 includes a first end 120 and a second end 122 opposite the first end. The first end 120 includes a first opening 121, and the second end 122 includes a second opening 123. A cavity 126 extends through the housing 110 from the first opening 121 in the first end 120 to the second opening 123 in the second end 121 The first opening 121 is circular, allowing rotation of the first elongated member 140 within the opening. The second opening 123 includes a keyed element, and the second elongated member 170 includes a complementary keyed element preventing rotation of the second elongated member 170 within the second opening 123. According to the illustrated embodiment, the keyed element of the second opening 123 and of the second elongated member 170 is a non-circular opening. The second opening 123 includes a first, circular segment 128 and a second, flat segment 129. The second elongated member 170 is configured with a sectional profile that corresponds to the shape of the second opening 123 such that the second elongated member slides within the opening. It is contemplated that the shape of the second opening 123 and the sectional profile of the second elongated member 170 may take numerous configurations without deviating from the scope of the invention. For example, the second opening 123 may be oval or square or, alternately, be circular with a tab protruding from one portion of the circular section. The second elongated member 170 may similarly have a sectional profile that is oval or square or, alternately be circular with a channel configured to receive the tab.

Figure 12:
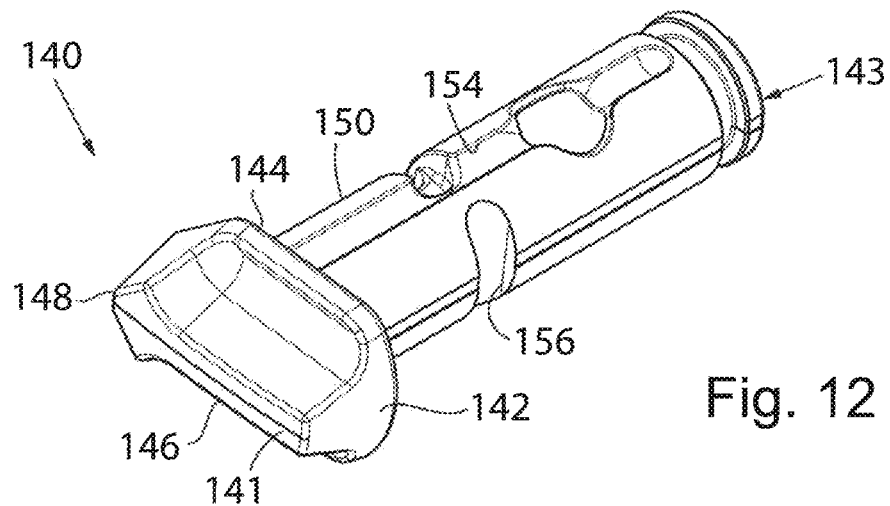
FIG. 12 is a perspective view of a first part of an actuator for the actuator assembly of FIG. 6.
Figure 13:
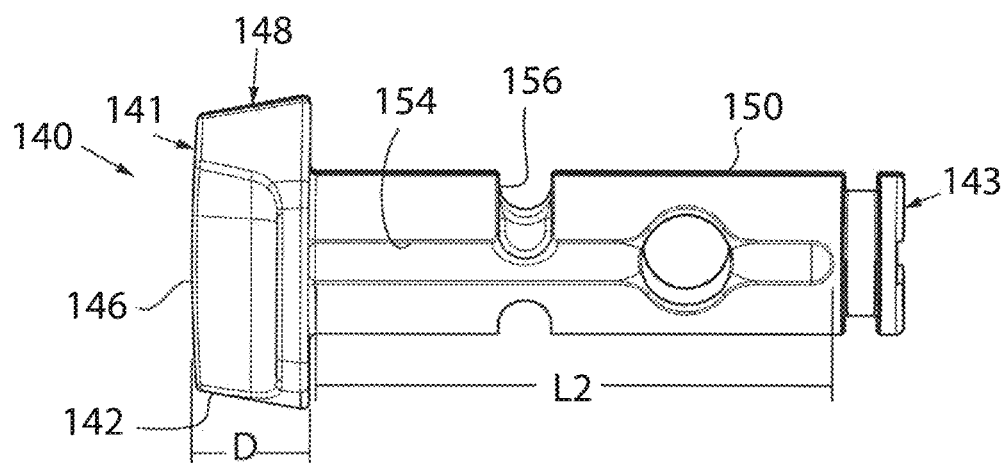
FIG. 13 is a top plan view of the first part of the actuator of FIG. 12.
Figure 14:
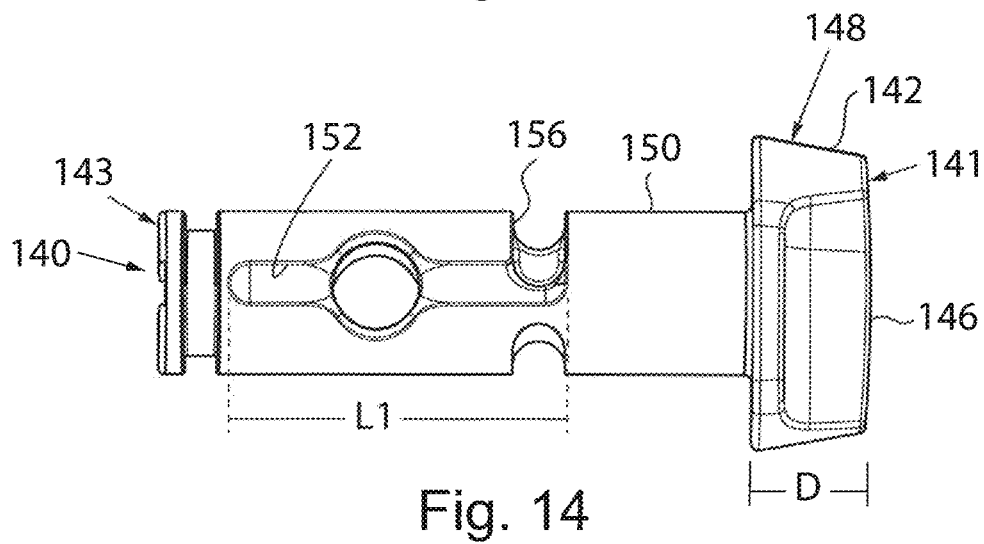
FIG. 14 is a bottom plan view of the first part of the actuator of FIG. 12.

With reference also to FIGS. 12-14, the first elongated member 140 forms a first, rotatable element of the actuator assembly 100. The first elongated member 140 includes a first end 141 and a second end 143 opposite the first end. The first end 141 of the first elongated member 140 includes a handle portion 142 configured to remain external to the module 10 when the actuator assembly 100 is mounted to the module, and the second end 143 of the first elongated member 140 is configured to be located within the housing 110. The handle portion 142 is configured to receive both a compression force and a rotational force from personnel manually engaging the actuator assembly 100. The handle portion 142 has a depth, D, extending from the first end 141 of the first elongated member 140 for a portion of the length of the first elongated member 140. The outer periphery of the handle portion 142 furthest from the first end 141 has an outer periphery 144 that has the greatest sectional area of the handle portion 142. A narrow center segment 146 of the handle portion 142 extends between sides of the handle portion 142 proximate to the first end 141 of the first elongated member 140. The center segment 146 of the handle portion 142 includes side surfaces extending generally orthogonal to the first end 141 for a portion of the depth, D, of the handle portion and then the side surfaces curve outward toward the outer periphery 144 of the handle portion. The orthogonal side surfaces of the center segment 146 are configured to be gripped on either side and to receive the rotational force, causing the first elongated member 140 to rotate within the housing 110. The curved surfaces toward the bottom of the handle portion are configured to receive a compression force, causing the first elongated member 140 to move into the housing 110. According to the illustrated embodiment, the handle portion 142 also includes an arrow segment 148 at one end of the center segment 146. The arrow segment 148 may be used to point toward an indicator affixed to the front 12 of the module 10 to identify the orientation of the first elongated member 140 within the housing 110. The arrow segment 148 is an exemplary indicium provided on the handle portion 142 to identify the orientation of the handle portion 142, Optionally, the center segment 146 may include, for example, a sticker, a painted surface, or other indicia to identify one end of the center segment and to point toward the complementary indicator affixed to the front 12 of the module 10 to identify the orientation of the first elongated member 140.

The first elongated member 140 also includes a slidable portion 150 configured to move into and out of the housing 110 via the first opening 121 in the housing. The slidable portion 150 includes a first channel 152 and a second channel 154 which each define a length that the first elongated member 140 may move into the housing 110. The first channel 152 extends longitudinally along the first elongated member 140 for a first length, L1, and the second channel 154 extends longitudinally along the first elongated member 140 for a second length, L2. The second length, L2, is greater than the first length, L1. A third channel 156 is defined around the periphery of the first elongated member 140 between the first channel 152 and the second channel 154. As will be discussed in more detail below, each of the first channel 152, the second channel 154, and the third channel 156 is configured to receive a guide member 160, which extends through an opening 130 in the housing 110, where the guide member 160 selectively engages one of the channels to define, at least in part, operation of the actuator assembly 100.

Figure 8:
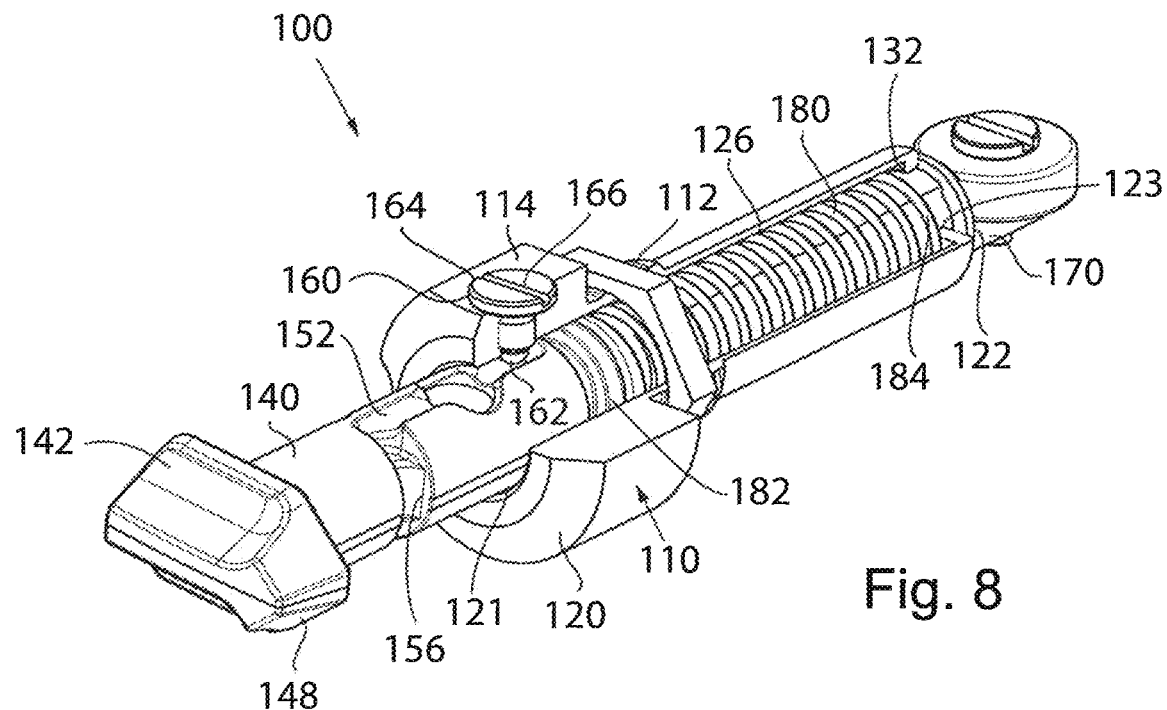
FIG. 8 is a partial sectional view of the actuator assembly of FIG. 6 in an uncompressed position.
Figure 9:
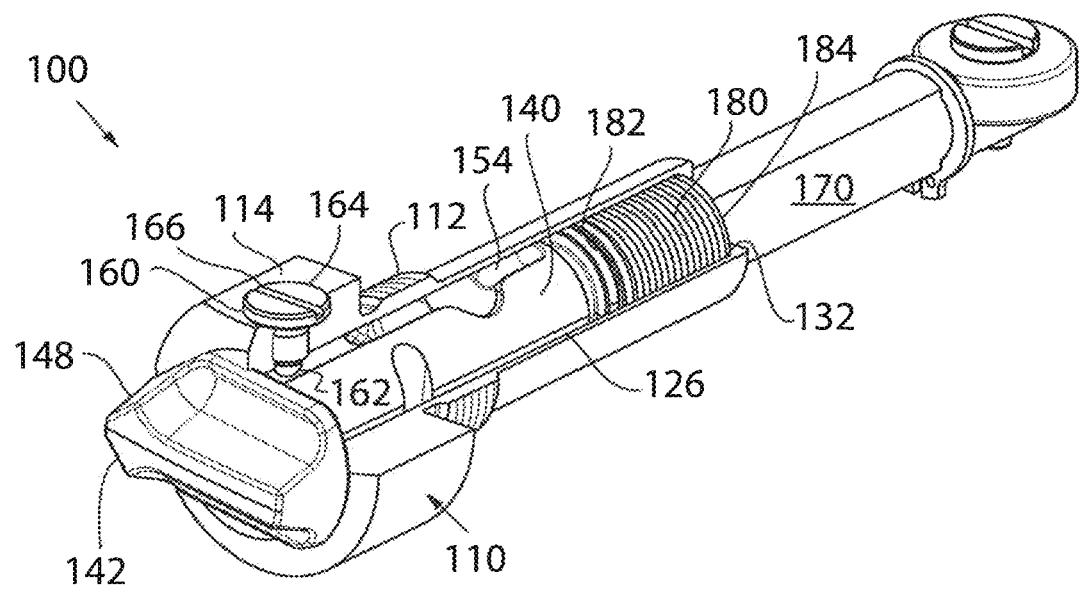
FIG. 9 is a partial sectional view of the actuator assembly of FIG. 6 in a compressed position.

With reference to FIGS. 8 and 9, one embodiment of the guide member 160 is illustrated. The guide member 160 extends through the opening 130 in the housing 110 and includes a semi-spherical end 162 protruding into the housing 110, An opposite end 164 may include, for example, a slot 166 configured, for example, to receive a screw driver. An external surface of the guide member 160 may be threaded and an inner periphery of the opening 130 in the housing 110 may also be threaded. The screw driver may be used to insert and secure the guide member 160 into the opening 130. When inserted into the opening 130, the semi-spherical end 162 of the guide member 160 engages one of the channels 152, 154, 156 of the first elongated member.

Figure 15:
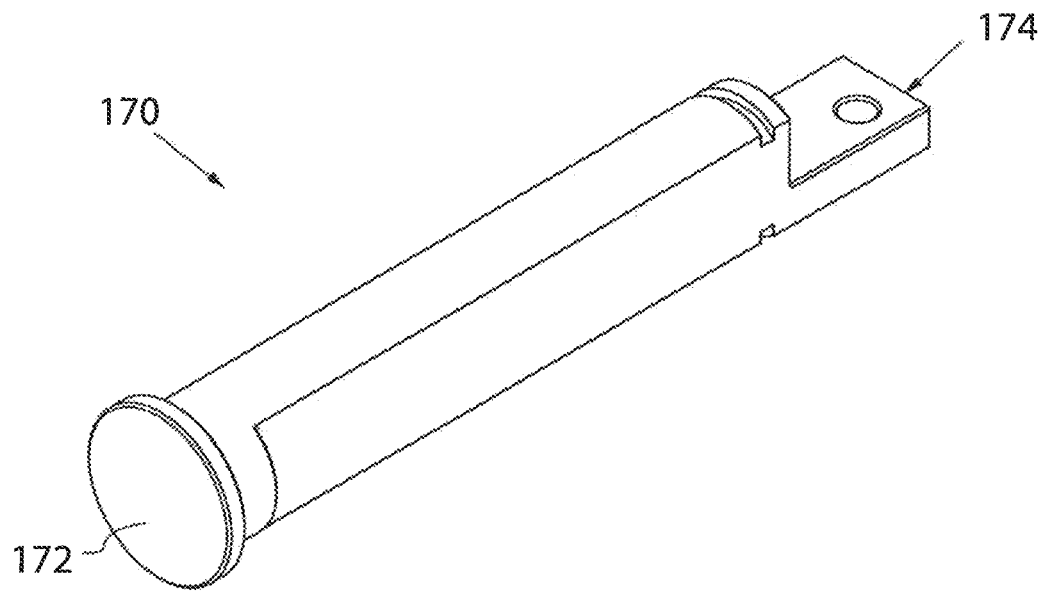
FIG. 15 is a perspective view of a second part of the actuator for the actuator assembly of FIG. 6 from the front, top, and side.
Figure 16:
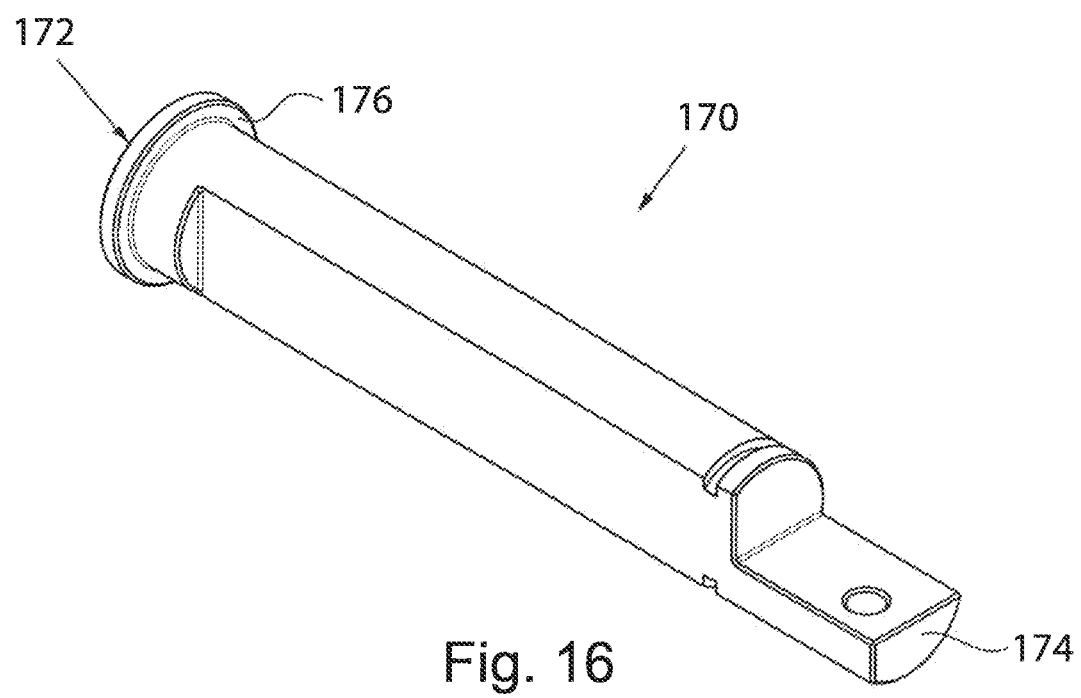
FIG. 16 is a perspective view of the second part of the actuator for the actuator assembly of FIG. 6 from the top, side, and rear.
Figure 17:
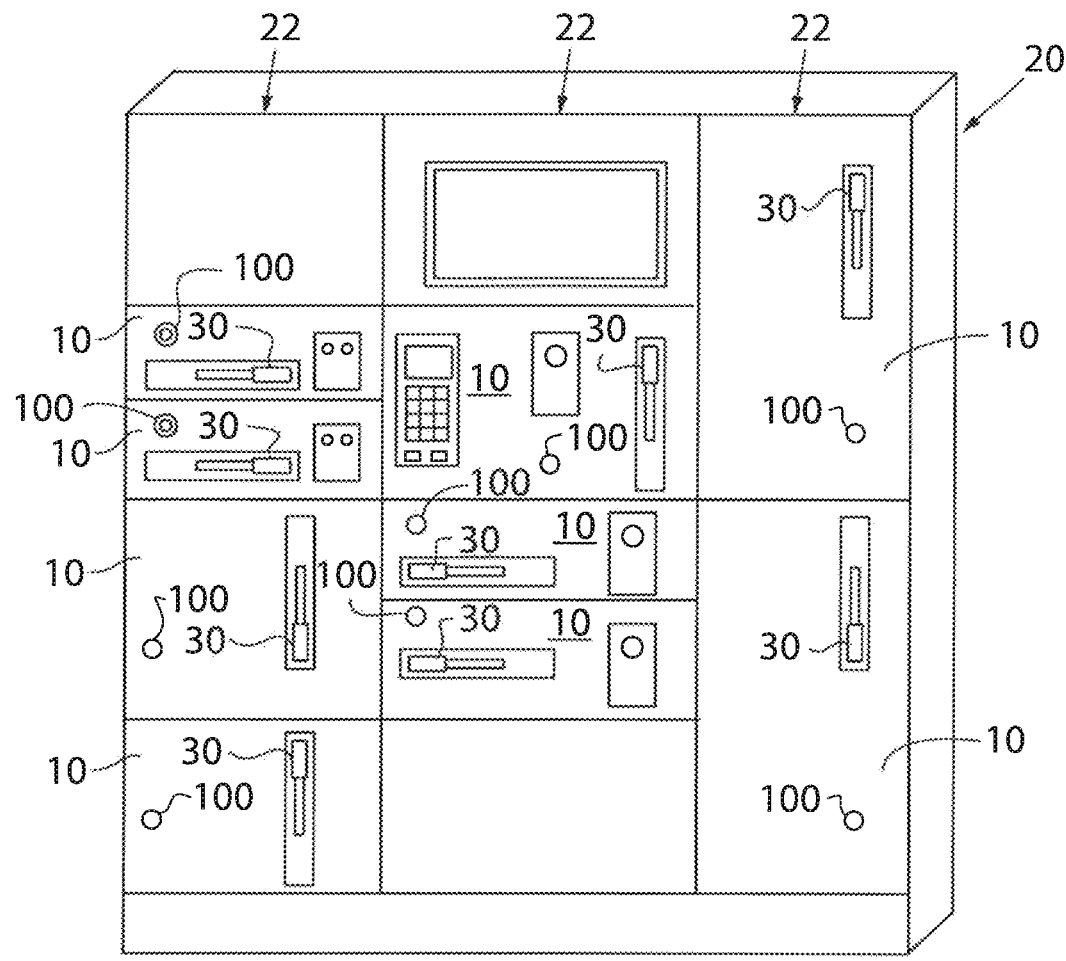
FIG. 17 is a front elevation view of an exemplary motor control center incorporating one embodiment of the present invention.

A second elongated member 170 is also fit, at least in part, within the housing 110 of the actuator assembly 100. With reference to FIGS. 15 and 16, the second elongated member 170 includes a first end 172 and a second end 174. The first end 172 of the second elongated member 170 is fit adjacent to the second end 143 of the first elongated member 140. The second elongated member 170 extends through the second opening 123 in the second end 122 of the housing 110 and the second end 174 of the second elongated member 170 is configured to be located external to the housing 110, As previously discussed, the second elongated member 170 is configured with a sectional profile that corresponds to the shape of the second opening 123 such that the second elongated member slides but does not rotate within the second opening 123 of the housing 110.

In operation, either a compression force or a rotational force is applied to the handle portion 142 of the first elongated member 140 to press or rotate the first elongated member 140 within the housing 110. The actuator assembly is configured to be angularly oriented in one of two positions. The two different angular orientations are illustrated in FIGS. 8 and 9. In FIG. 8, the arrow segment 148 of the handle portion is pointing to the right as an indication of the first angular orientation. In the first position, the guide member 160 engages the first channel 152 of the first elongated member 140. In FIG. 9, the arrow segment 148 of the handle portion is pointing to the left as an indication of the second angular orientation. In the second position, the guide member 160 engages the second channel 154 of the first elongated member 140. The third channel 156 connects the first channel 152 and the second channel 154. When the guide member 160 is positioned at the end of the first channel 152 to which the third channel 156 connects, a rotational force applied to the handle portion 142 rotates the first elongated member 140 within the first opening 121 of the housing 110. As the first elongated member 140 rotates, the guide member travels in the third channel 156 between the first and second channels. When the guide member 160 reaches the second channel 154, the guide member prevents further rotation and the first elongated member is in the second angular orientation. With the guide member 160 located in the second channel 154 and aligned with the third channel 156, a rotational force in the other direction similarly causes the first elongated member 140 to return to the first angular orientation.

A compression force applied to the handle portion 142 will cause the first elongated member 140 to move into the housing 110 for different lengths as a function of the angular orientation at which the first elongated member 140 is located. With reference again to FIGS. 8 and 14, the first elongated member 140 is located in the first angular orientation, and the guide member 160 is in the first channel 152. The first channel 152 has a first length, L1, and the guide member 160 restricts travel of the first elongated member 140 inward and outward with respect to the housing 110 for the length, L1, of the first channel 152. With reference to FIGS. 9 and 13, the first elongated member 140 is located in the second angular orientation, and the guide member 160 is in the second channel 154. The second channel 154 has a second length, L2, and the guide member 160 restricts travel of the first elongated member 140 inward and outward with respect to the housing 110 for the length, L2, of the second channel 152.

Movement of the first elongated member 140 into and out of the housing 110 results alternately from a compression force applied to the handle portion 142 and from an opposing force generated by a spring 180 mounted within the housing 110. The spring 180 has a first end 182 and a second end 184. The first end 182 of the spring 180 is configured to mount against a first spring seat 176 located at the first end 172 of the second elongated member 170 and against a second spring seat 132 located at the second end 122 of the housing. The spring 180 exerts a force longitudinally along the actuator assembly 100 pushing the first end 172 of the second elongated member 170 against the first elongated member 140 and, in turn, pushing the first elongated member 140 out the first opening 121 in the housing 110. The guide member 160 in either the first channel 152 or the second channel 154 acts as a stop, engaging one end of the channel and preventing the first elongated member 140 from being ejected from the housing 110. When a compression force sufficient to overcome the spring force is applied to the handle portion 142, the compression force causes the first elongated member 140 to slide into the housing 110. When the guide member 160 is positioned in the first channel 152, the first elongated member 140 may travel into the housing 110 for the first length, L1, the first channel. When the guide member 160 is positioned in the second channel 154, the first elongated member 140 may travel into the housing 110 for the second length, L2, of the second channel. When the compression force is removed, the counter force generated by the spring 180 causes the first elongated member 140 to extend outwards from the housing 110.

Movement of the first elongated member 140 causes movement of the second elongated member 170. As previously indicated, the first end 172 of the second elongated member 170 is seated against the second end 143 of the first elongated member 140. When the first elongated member 140 slides in and out of the first opening 121 in the housing 110, the motion of the first elongated member 140 causes the second elongated member 170 to slide out of and back into the second opening 123 in the housing 110. However, the keyed nature of the second opening 123 prevents the second elongated member 170 from rotating as the first elongated member 140 rotates. Thus, the second elongated member 170 only moves longitudinally into and out of the housing 110 for the actuator assembly 100 as a result of the application of the compression force to the handle portion 142 or of the countering force generated by the spring 180 but does not rotate with the application of a rotational force to the handle portion 142.

With reference next to FIGS. 2-5, operation of the actuator assembly 100 is used to interlock motion of the selection handle 30 and, therefore, to interlock selection of an operating for the module 10 within the MCC 20. In FIG. 2, the module 10 is shown in an off operating state. The connection handle 30 is centrally positioned, the actuator assembly is in the first angular orientation, such that the guide member 160 is engaging the first channel 152, and no compression force has been applied to the handle portion 142, such that the first elongated member 140 is fully extending from the housing 110. The second end 174 of the second elongated member 170 engages the locking plate 60 within the module. According to the illustrated embodiment, a wheel 176 mounted to the second end 174 of the second elongated member 170 engages a ramp 64 on the locking plate 60. Motion of the second elongated member 170 into the module 10 causes the wheel 176 to engage the ramp 64 and to draw the locking plate 60 away from the rotating plate 40 to which the connection handle 30 is mounted. Optionally, the second end 174 of the second elongated member 170 may have an angled surface configured to engage the ramp 64 on the locking plate 60. With no compression force applied, the second elongated member 170 is fully retracted within the housing 110 of the actuator assembly 100 and the second end 174 of the second elongated member 170 is positioned at a first end of the ramp 64. The locking plate 60, in turn, fully engages one of the detents 42, 44, 46 in the rotating member 40 preventing rotation.

Figure 3:
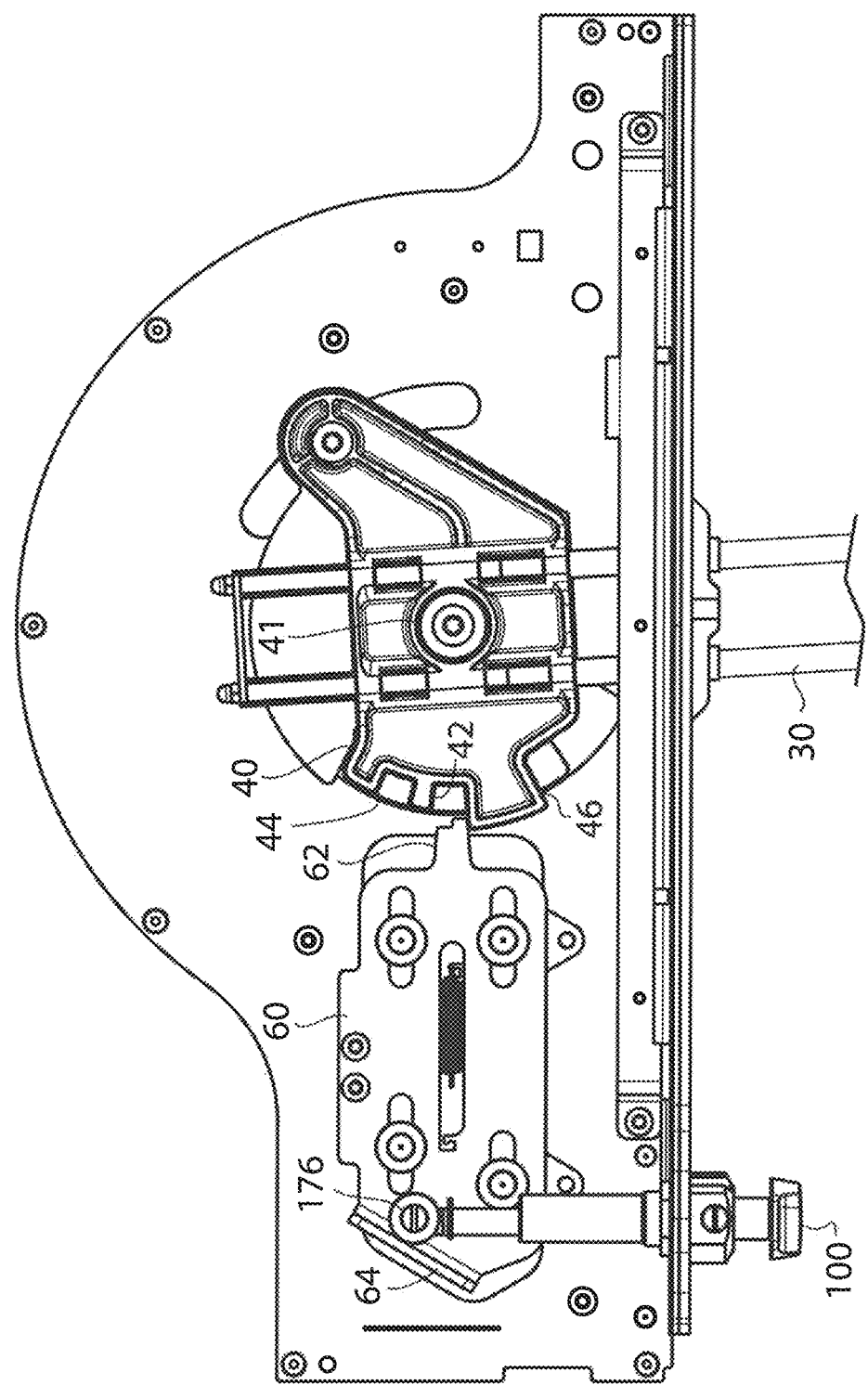
FIG. 3 is a top plan view of the module of FIG. 1 with the actuator assembly according to one embodiment of the invention in a second position, with the linking plate interlocking the connection handle in either an off position or a test position, and with the connection handle in the off position.
Figure 4:
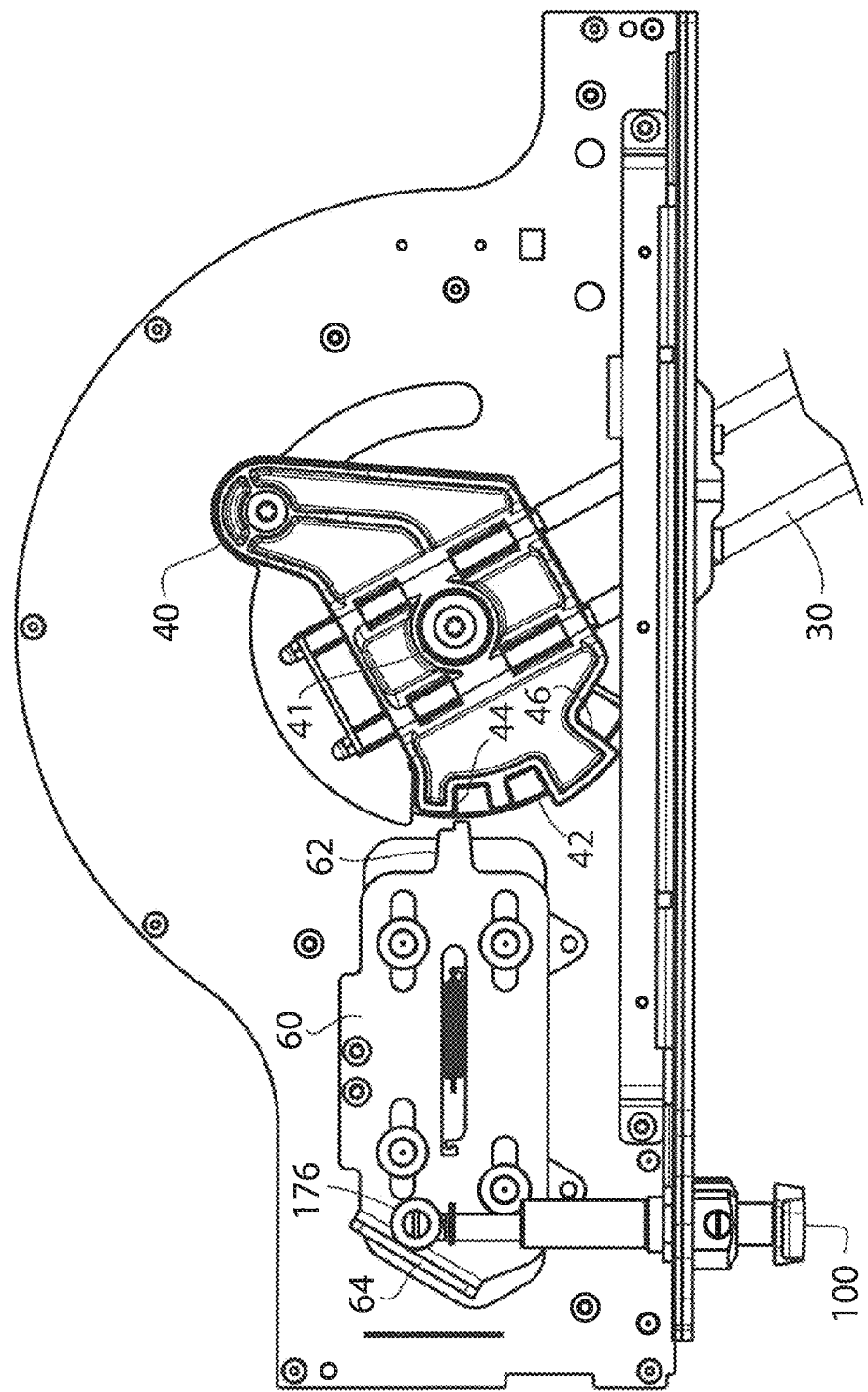
FIG. 4 is a top plan view of the module of FIG. 1 with the actuator assembly according to one embodiment of the invention in the second position, with the linking plate interlocking the connection handle in either an off position or a test position, and with the connection handle in the test position.
Figure 5:
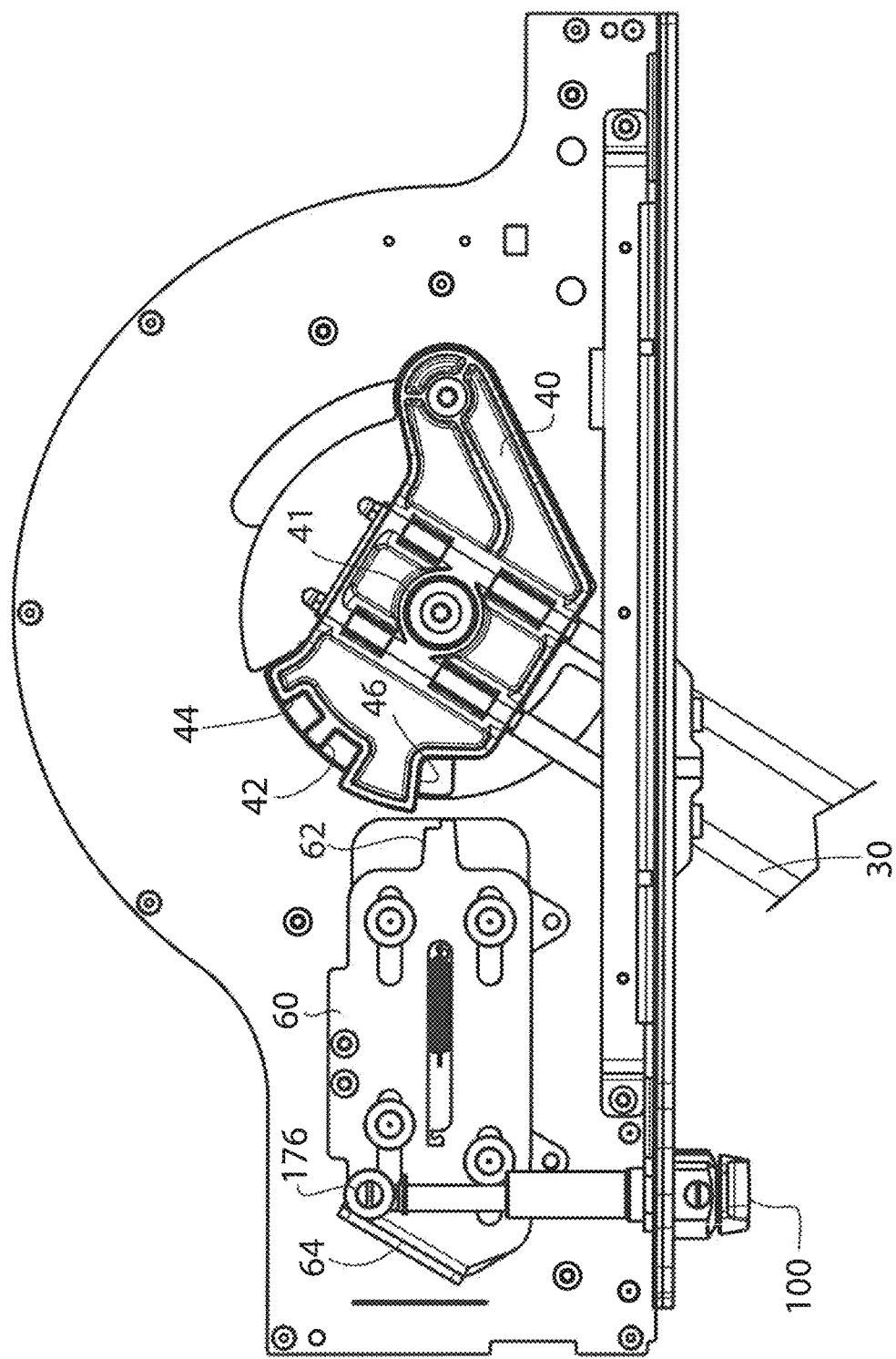
FIG. 5 is a top plan view of the module of FIG. 1 with the actuator assembly according to one embodiment of the invention in a third position, with the linking plate no longer interlocking the connection handle, and with the connection handle in the on position.
Figure 6:
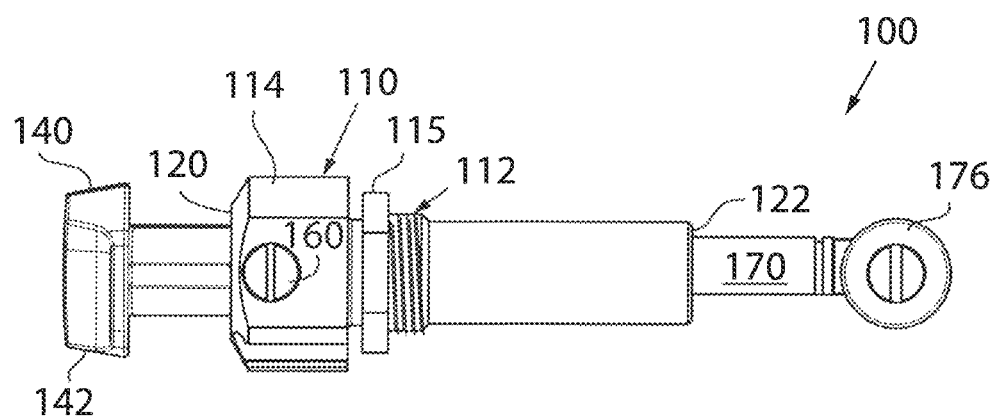
FIG. 6 is a top plan view of the actuator assembly of FIGS. 1-5.
Figure 7:
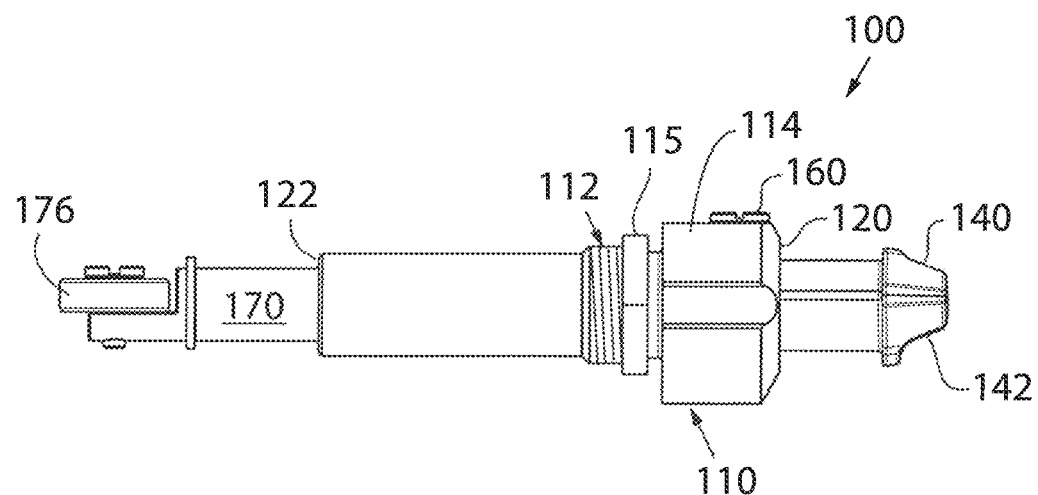
FIG. 7 is a side elevation view of the actuator assembly of FIGS. 1-5.

In FIGS. 3 and 4, a compression force has been applied to the handle portion 142 of the first elongated member, and the first elongated member 140 is pressed into the housing 110 for the first length, L1, of the first channel 152. The second elongated member 170 has, in turn, been displaced out the second opening 123 of the housing 110, and the second end 174 of the second elongated member 170 moves along the ramp 64 on the locking plate 60. As the second end 174 of the second elongated member 170 engages the ramp 64, the locking plate 60 is drawn away from the rotating plate 40. With the first elongated member 140 fully pressed into the housing in the first orientation, the connection handle 30 may be rotated between the off and the test positions. The connection handle 30 is shown in the off position in FIG. 3 and in the test position in FIG. 4. The protruding member 62 on the locking plate allows rotation between the first detent 42 (off operating state) and the second detent 44 (test operating state) while preventing rotation to the third detent 46 (on operating state). As a result, with the first elongated member 140 in the first angular orientation, the actuator assembly allows the module 10 to be selectively put in only the off operating state or the test operating state and prevents the module 10 from being put in the on operating state, During initial insertion, therefore, the actuator assembly 100 is configured with the first elongated member 140 in the first angular orientation to prevent inadvertent movement of the connection handle 30 to the on operating stated.

Once the module 10 has completed testing, the actuator assembly 100 may be moved to the second angular orientation to allow the module to be put into the on operating state. The rotational force is applied to the handle portion 142 of the first elongated member 140, rotating the first elongated member 140 from the first angular orientation to the second angular orientation. With the guide member 160 in the second channel 154, the compression force applied to the handle portion 142 may now cause the first elongated body 140 to fully insert into the housing 110. The second elongated body 170, in turn, extends fully from the second end 122 of the housing 110, and the second end 174 of the second elongated body 170 fully engages the ramp 64 on the locking plate 60. The protruding member 62 on the locking plate 60 is drawn a sufficient distance from the rotating plate 40 to allow the rotating plate to move between any of the three detents 42, 44, and 46. Thus, the module 10 may be put into any desired operating state, including the on operating state. The connection handle 30 is illustrated in the on operating state in FIG. 5.

After a desired operating state has been selected, the compression force to the actuator assembly 100 is removed and the spring 180 forces the first and second elongated bodies hack to their original position. The second end 174 of the second elongated body 170 moves back to the first end of the ramp 64 and the protruding member 62 on the locking plate 60 engages the detect 42, 44, 46 corresponding to the selected operating state. Transition between operating states requires a two-step actuation process, where the actuator assembly is oriented in the desired orientation and pressed in for the desired depth to remove the locking plate 60 from the rotating plate 40 and then allowing the connection handle 30 to move between positions corresponding to a desired operating state.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense,

We claim:

1. An apparatus for interlocking selection of an operating mode for a module in a motor control center, the apparatus comprising:
  a housing having:
    a first end and a second end;
    a first opening in the first end,
    a second opening in the second end, and
    a cavity extending through the housing from the first opening to the second opening;
  a first elongated member configured to be mounted within the housing and extending through the first opening, the first elongated member having:
    a first channel extending along a first length of a surface of the first elongated member,
    a second channel extending along a second length of the surface of the first elongated member, the second length greater than the first length, and
    a third channel extending between the first channel and the second channel;
  a guide member mounted within the housing, the guide member configured to selectively engage the first channel, the second channel, or the third channel;
  a second elongated member configured to be mounted within the housing and extending through the second opening, the second elongated member having a first end configured to engage the first elongated member within the housing and a second end positioned outside the housing; and
  a spring having a first end mounted to the first elongated member and a second end configured to engage a spring seat at the second end of the housing.

2. The apparatus of claim 1 wherein the second opening includes a keyed portion and wherein the second elongated member includes a keyed portion configured to engage the keyed portion of the second opening.

3. The apparatus of claim 2 wherein the keyed portion of the second opening includes at least one surface on a periphery of the second opening that is not circular and wherein the second elongated member has an outer periphery corresponding to the periphery of the second opening such that the second elongated member may move in and out of the second opening but may not rotate within the second opening.

4. The apparatus of claim 1 wherein a first end of the first elongated member is configured to remain outside the first opening and wherein the first end of the first elongated member includes a handle portion configured to receive a compression force and a rotational force.

5. The apparatus of claim 1 further comprising a locking plate selectively moved between a plurality of positions by the second end of the second elongated member.

6. The apparatus of claim 5 wherein the locking plate is configured to selectively move between a first position and a second position when the guide member selectively engages the first channel and the locking plate is configured to move to a third position only when the guide member selectively engages the second channel.

7. The apparatus of claim 5 further comprising a connection handle selectively engaged by the locking plate, wherein the connection handle is movable between one of a plurality of positions as a function of the position of the locking plate.

8. An apparatus for interlocking selection of an operating mode for a module in a motor control center, the apparatus comprising:
  a housing having a cavity extending a length of the housing;
  an actuator including:
    a first part extending, at least in part, from a first end of the housing, the first part of the actuator configured to receive a compression force and a rotational force, and
    a second part extending, at least in part, from a second end of the housing, the second part of the actuator configured to engage the first part of the actuator within the housing; and
  a spring mounted within the housing, wherein:
    the first part of the actuator is configured to move between a first orientation and a second orientation responsive to the rotational force,
    the first part of the actuator enters a first end of the housing a first distance in the first orientation responsive to the compression force,
    the first part of the actuator enters the first end of the housing a second distance in the second orientation responsive to the compression force, the spring returns the first part of the actuator to an extended position when the compression force is removed, the second part of the actuator engages the first part of the actuator to extend from and retract into a second end of the housing when the first part of the actuator enters and exits the first end of the housing, and the second part of the actuator is configured to maintain a consistent orientation when the first part of the actuator rotates between the first and second orientations.

9. The apparatus of claim 8 wherein the second part of the actuator has a first end configured to engage the first part of the actuator within the housing and a second end positioned outside the housing.

10. The apparatus of claim 8 wherein the first part of the actuator includes:
a first channel extending along a first length of a surface of the first part of the actuator,
a second channel extending along a second length of the surface of the first part of the actuator, the second length greater than the first length, and
a third channel extending between the first channel and the second channel.

11. The apparatus of claim 10 further comprising a guide member mounted within the housing, the guide member configured to selectively engage the first channel, the second channel, or the third channel.

12. The apparatus of claim 11 wherein the guide member moves along either the first channel or the second channel responsive to the compression force and wherein the guide member moves along the third channel responsive to the rotational force.

13. The apparatus of claim 11 further comprising a locking plate selectively moved between a plurality of positions by the second part of the actuator extending from the second end of the housing.

14. The apparatus of claim 13 wherein the locking plate is configured to selectively move between a first position and a second position when the guide member moves along the first channel and the locking plate is configured to move to a third position only when the guide member moves along the second channel.

15. The apparatus of claim 13 further comprising a connection handle selectively engaged by the locking plate, wherein the connection handle is movable between one of a plurality of positions as a function of the position of the locking plate.

16. The apparatus of claim 8 wherein the second end of the housing includes a keyed portion and wherein the second part of the actuator includes a keyed portion configured to engage the keyed portion of the housing.

17. The apparatus of claim 8 wherein a first end of the first part of the actuator is configured to remain outside the housing and wherein the first end of the first part of the actuator includes a handle portion configured to receive the compression force and the rotational force.

18. A method for interlocking selection of an operating mode for a module in a motor control center, the method comprising the steps of:
pressing an actuator to move the actuator from a first position to either a second position or a third position, wherein:
the actuator includes a first channel extending between the first position and the second position,
the actuator includes a second channel extending between the first position and the third position,
the second channel having a greater length than the first channel, and
the actuator includes a guide member configured to engage either the first channel or the second channel;
moving a connection handle extending from, a front surface of the module between one of a plurality of positions, wherein:
the operating mode corresponds to the position of the connection handle,
the connection handle is movable only between a first position and a second position when the guide member engages the first channel, and
the connection handle is movable to a third position when the guide member engages the second channel.

19. The method of claim 18 further comprising the step of rotating the actuator between a first angular orientation and a second angular orientation, wherein rotating the actuator translates the guide member between the first channel and the second channel via a third channel.

20. The method of claim 18 further comprising the steps of:
translating a locking plate between a first position and a second position with the actuator when the actuator moves between the first position and the second position; and
translating the locking plate to a third position with the actuator when the actuator moves to the third position, wherein the locking plate prevents the connection handle from moving to the third position when the guide member engages the first channel and wherein the locking plate allows the connection handle to move to the third position when the guide member engages the second channel.

* * * * *